United States Patent [19]

Sato

[11] Patent Number: 5,128,773
[45] Date of Patent: Jul. 7, 1992

[54] COMPACT VIDEO PRINTER EMPLOYING A LIQUID CRYSTAL PANEL

[75] Inventor: Masamichi Sato, Tokyo, Japan

[73] Assignee: Fuji Photo Film Co., Ltd., Kanagawa, Japan

[21] Appl. No.: 498,052

[22] Filed: Mar. 23, 1990

[30] Foreign Application Priority Data

Mar. 28, 1989 [JP] Japan .................................. 1-73929
Sep. 14, 1989 [JP] Japan .................................. 1-237094

[51] Int. Cl.[5] .............................................. H04N 5/76
[52] U.S. Cl. ................................. 358/332; 346/160
[58] Field of Search ............... 358/244, 244.1, 244.2, 358/332, 335; 346/160, 107 R, 110 R; 355/18

[56] References Cited

U.S. PATENT DOCUMENTS

| | | | |
|---|---|---|---|
| 4,200,392 | 4/1980 | Svatek | 355/43 |
| 4,646,249 | 2/1987 | Tanioka et al. | 358/244 |
| 4,899,224 | 2/1990 | Ooba et al. | 358/332 |
| 4,942,426 | 7/1990 | Jones et al. | 355/91 |

OTHER PUBLICATIONS

Electronic Color Printing with a Liquid-Crystal Light Modulator on Low Sensitivity Photographic Materials, Richard V. Kollarits, et al, AT&T Bell Laboratories, SID 88 Digest, pp. 190-193.

"Full Color Printing with Two Dimensional Bilevel Liquid-Crystal Modulator", Japan Display 1989, pp. 138-141 by Y. Ooba and T. Masumori.

Primary Examiner—Roy N. Envall, Jr.
Assistant Examiner—Huy Nguyen
Attorney, Agent, or Firm—Sughrue, Mion, Zinn, Macpeak & Seas

[57] ABSTRACT

A video printer for receiving a video signal of an image to record a visible image thereof on a photosensitive recording medium is located in a generally compact housing. A liquid crystal panel is tightly fixed onto the photosensitive recording medium so that the liquid crtystal panel is driven by the video signal to display an image. The liquid crystal panel on which the image is displayed is supplied with a light from a light source such that the photosensitive recording medium is exposed to the light depending on the displayed image. The medium is then developed to form a visualized image. The video printer is compact and is easily operated to produce a hard copy.

8 Claims, 5 Drawing Sheets

COMPACT VIDEO PRINTER EMPLOYING A LIQUID CRYSTAL PANEL

BACKGROUND OF THE INVENTION

1. Field of the Invention

The present invention relates to a video printer and particularly to a video printer in which a video signal is processed to produce a hard copy as a visible image.

2. Description of the Prior Art

Conventionally, a visible image recording apparatus commonly known as a video printer has been of a large size in many cases. For example, in accordance with the Japanese Patent Laid-Open Publication No. 16695/1987 filed by the applicant of the present invention, an image recording apparatus receives a video signal of an image shot by an electronic still camera so as to produce the image on a CRT, thereby recording the image on a sheet of color photographic paper. The apparatus is primarily suitable for professional uses to create a color hard copy with a high resolution. However, this device necessitates an optical system for generating a focused image of the CRT image on the photographic paper, which increases the size of the apparatus and requires a long period of time for the image recording operation. Therefore, the apparatus is expensive.

As an image recording apparatus similarly employs a CRT, an instant-type equipment has been known. In this system, an exposure of an instant photosensitive material is conducted by use of an image displayed on a CRT. The apparatus includes a focusing optical system adopting an optical fiber or a lens. According to this method, the system configuration is simple and the print time is short; however, due to necessity of the focusing optical system, the apparatus size is increased.

Furthermore, as described in the Japanese Patent Publication No. 10991/1989 (Japanese Patent Laid-Open No. 212287/1983), for example, a thermal printer for producing a hard copy of an image by transcribing a dye having a thermal diffusion characteristic onto an image receiving medium has been proposed. This apparatus adopts a thermal head in which heating elements are arranged in a line and does not require any optical system. In consequence, although the system size is relatively minimized, the system cannot be conveyed in a pocket, for example. Although the price of the apparatus is relatively low, a long period of print time is necessary. A general tendency of electronic apparatus is also recognized in the field of video printers. That is, a small-sized video printer in which a hard copy of a visible image is easily produced from a usual video signal has been desired.

SUMMARY OF THE INVENTION

It is therefore an object of the present invention to provide a compact, simple, and low-price video printer in which the print time is minimized, thereby meeting the requirements above.

In accordance with the present invention, a video printer in which a video signal representing an image is received so as to record a visible image from the video signal on a photosensitive recording medium comprises an input terminal means for receiving the video signal as an input thereto, a recording medium accommodating section for accommodating the photosensitive recording medium, a liquid crystal panel means tightly fixed on a photosensitive surface of the photosensitive recording medium so as to be driven by the video signal to display the image as a monochrome image, a light source for producing a visible light, an optical system for conducting the visible light from said light source substantially in the form of a collimated beam to said liquid crystal panel means, a housing for mounting therein said input terminal means, said recording medium accommodating section, said liquid crystal panel means, said light source, and said optical system, develop means arranged in said housing for introducing therein the photosensitive recording medium from said recording medium accommodating section so as to develop the medium, thereby ejecting the medium from said housing; and an electronic circuit mounted in said housing for receiving a video signal at said input terminal means and for driving said liquid crystal panel means in response to the video signal so as to control said liquid crystal panel means and said light source.

The electronic circuit drives, on receiving the video signal at said input terminal means, said liquid cyrstal panel means in response to the video signal so as to cause said light source to emit a light, thereby conducting an exposure of the photosensitive surface of the photosensitive recording medium via said optical system and said liquid crystal panel means. Subsequently, the circuit causes said develop means to develop the photosensitive recording medium so as to eject the developed medium.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
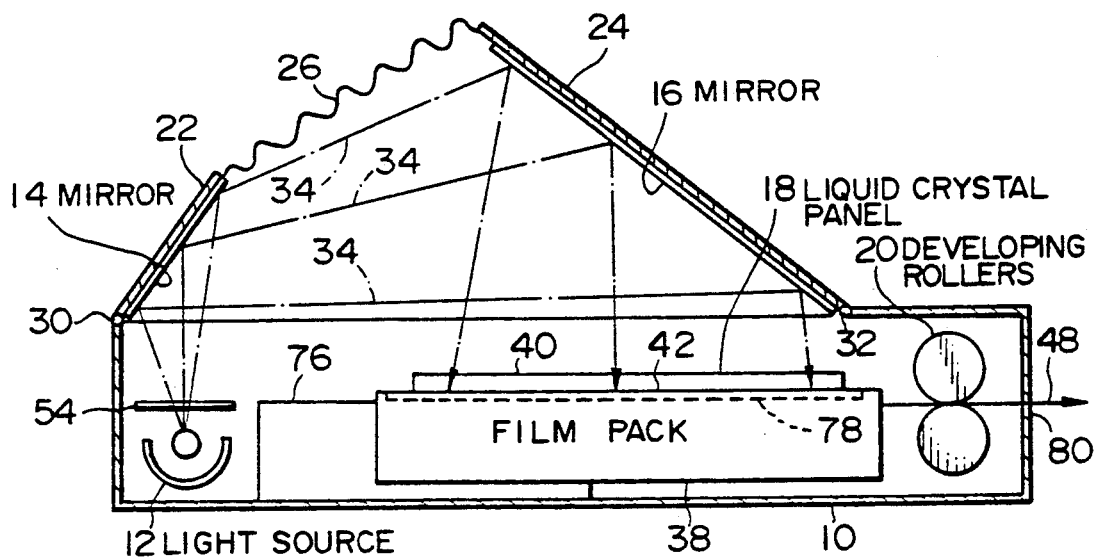
FIG. 1 is a cross-sectional diagram of an embodiment of a video printer in accordance with the present invention in which the printer is in an operating state.

Referring to the drawings, a description will be given in detail of an embodiment of a video printer in accordance with the present invention.

Figure 2:
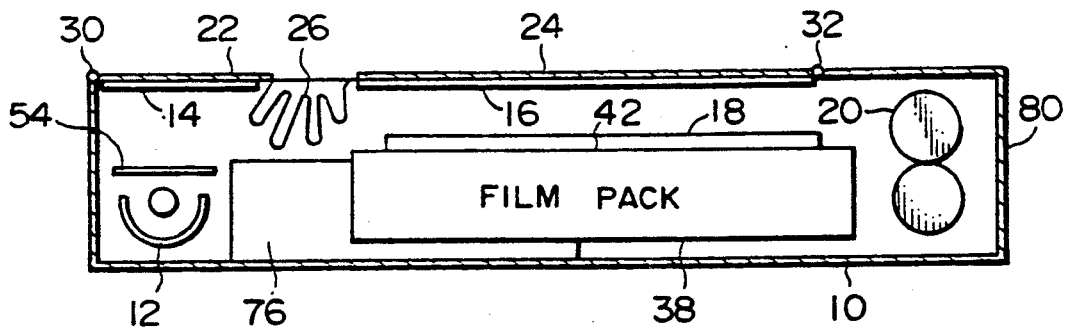
FIG. 2 is a cross-sectional diagram of the embodiment of FIG. 1 in which the printer is not in the operating state.
Figure 3:
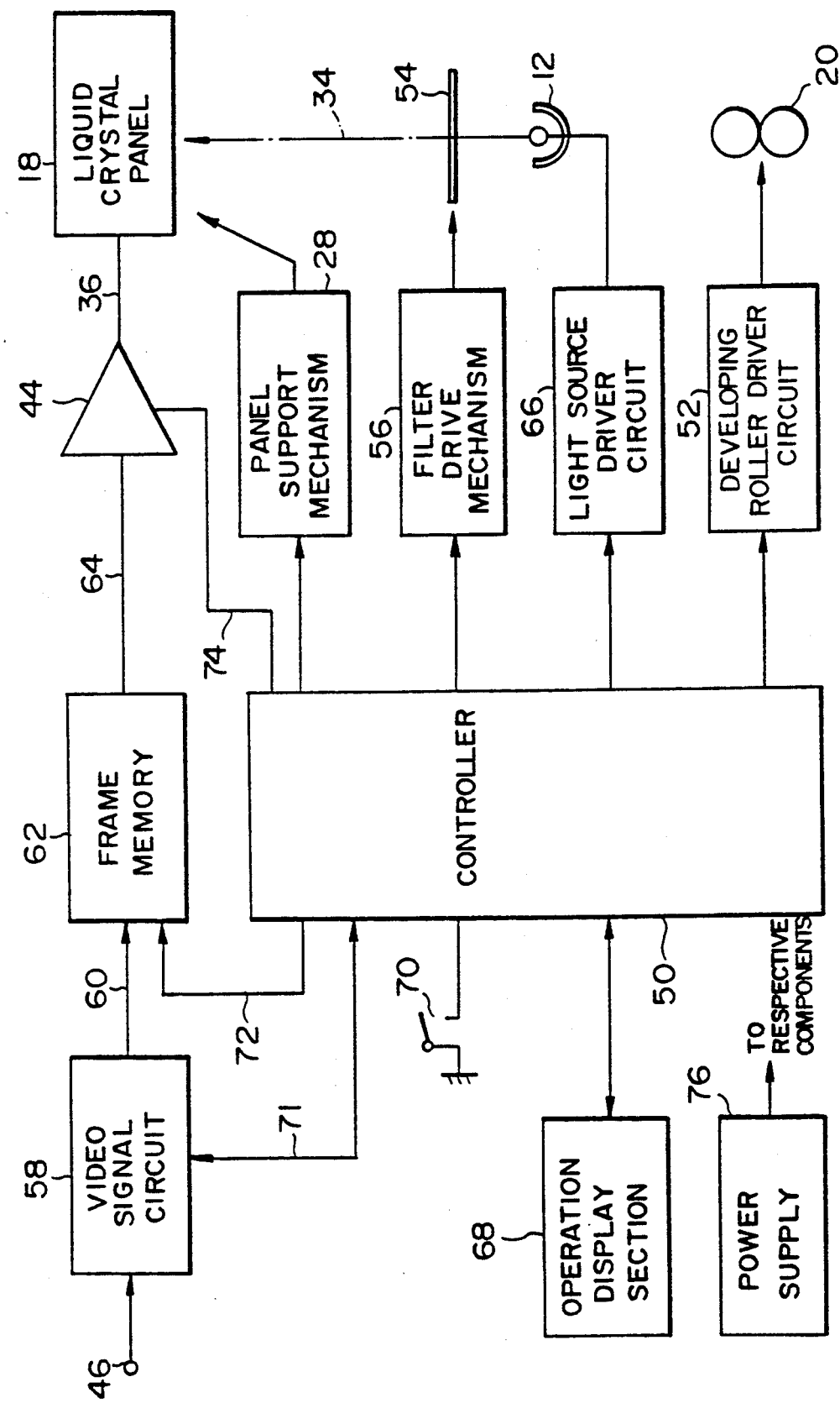
FIG. 3 is a functional block diagram showing a circuit constitution example of the embodiment of FIG. 1.

Referring now to FIGS. 1 to 3, a video printer of this embodiment is a color image recording apparatus which receives a color video signal at an input terminal 46 to record on a recording medium 78 as a hard copy a color image represented by the color video signal. The apparatus basically includes a housing 10 generally formed in a rectangular parallelepiped or a cuboid in which a light source 12, mirrors 14 and 16, a liquid crystal panel 18, a developing roller unit 20, and a power source 76 are arranged as shown in the figure. In an upper portion of the housing 10, as shown in the figure, a primary section thereof is opened such that two covers 22 and 24 are disposed so as to be opened and/or closed. Disposed on respective inner sides of the covers 22 and 24 are the mirrors 14 and 16. The covers 22 and 24 are linked with each other by means of bellows 26 so as to optically block the opening of the housing 10. As a result, the inner space of the housing 10 is configured in the form of a darkbox.

The light source 12 is disposed in the proximity of a left-most end portion in the housing 10 as shown in the figure. The liquid crystal panel 18 is located substantially at a center of the inner space of the housing 10 so as to be supported thereon by means of a panel support mechanism 28. The cover 22 is retained on the housing by use of a hinge 30 such that the cover 22 is manually rotable thereabout. As shown in FIG. 1, the cover 22 opens up to a predetermined position having an angle slightly greater than 45° with respect to the horizontal direction so as to be sustained at the position. Similarly, the cover 24 is supported on the housing 10 by means of a hinge 32 so as to be manually rotated such that the cover 24 opens up to a predetermined position having an angle slightly smaller than 45° with respect to the horizontal direction so as to be retained at the position.

The light source 12, the mirrors 14 and 16, and the liquid crystal panel 18 are located with positional relationships such that when the covers 22 and 24 are opened to be sustained at the respective predetermined positions, a light beam 34 emitted from the light source 12 is reflected on these mirrors 14 and 16 as shown in the figure, so that the reflected light is irradiated as a collimated light substantially on a principal surface 40 of liquid crystal panel 18 with an angle between the light and the surface 40 set to be approximately a right angle. The system includes a switch 70 responsive to the opening operations of the covers 22 and 24 to the predetermined positions. The switch 70 is connected to a control circuit 50 as shown in FIG. 3 so that the control circuit 50 senses the opened state of the covers 22 and 24 to the predetermined positions.

When the covers 22 and 24 are closed, the overall appearance of the housing is flat as shown in FIG. 2. In this state, the apparatus is quite compact so as to be carried about in a pocket of the user.

The liquid crystal panel 18 includes a large number of liquid crystal display elements arranged in a two-dimensional form configuring a rectangular matrix array. When driven by a drive input 36 associated with a video signal, the liquid crystal panel 18 displays a visible monochrome picture, thereby functioning as an image visualizing device. The drive input 36 is fed from a driver circuit 44, which will be described later. As well known, the panel 18 changes, when thus driven in association with the video signal. The transmittivity with respect to the light associated with a pixel density represented by the signal. In consequence, the light 34 incident to the principal surface of the panel 18 is brightness-modulated depending on a density component of the video signal. The resultant signal is emitted from other principal surface 42 of the panel 18. In this embodiment, the driver circuit 44 and the liquid crystal panel 18 are of an active matrix drive type. For this purpose, the controller 50 supplies a scan timing signal via a control line 74 thereto.

In a side 42 of the panel 18 opposite to the principal surface 40 onto which the light 34 is irradiated, a film pack 38 is installed. A film pack 38 accommodating a plurality of photosensitive recording media 78 such as photosensitive members of the instant photograph is advantageously employed. The photosensitive member of the film pack 38 of this type includes a photosensitive sheet 78 as commonly known and a bag or container disposed at edge portions of the sheet 78 for storing therein a developer agent. A plurality of these photosensitive members are accumulated in a pack. After a latent image is recorded on the sheet 78, the container of the developer is broken to spread the developer on the photosensitive sheet 78, thereby creating a visible image from the latent image. In order to spread the developer, this apparatus includes a pair of developing rollers 20. Disposed on a side surface of the housing is an opening, not shown, to install therethrough the film pack 38. Namely, through the opening, the film pack 38 is installed/removed in/from the housing 10.

The photosensitive recording medium 78 is not restricted by the photosensitive material used for the instant photograph. For example, the color printing paper commonly used and a silver halide photosensitive member of a thermal developing type may also be applicable. As the photosensitive material, a silver halide photosensitive member of a thermal developing type is favorable. When recording a monochrome image, the usual monochrome print paper may be employed. When the print paper above is adopted, in place of the developing rollers 20, an appropriate developing mechanism is disposed to apply the developer agent on the print paper.

As shown in FIG., 1, an upper-most one of the photosensitive sheets 78 accumulated in the film pack 38 can be ejected, as indicated by an arrow 48, from a side surface of the pack 38 by means of the developing roller unit 20. The roller unit 20 includes a pair of rollers supported on the housing 10 such that the rollers rotate with respective surfaces thereof brought into contact with each other. The rollers 20 are rotated by a developing roller drive circuit 52 under control of the control circuit 50. In order to eject the photosensitive sheet 78 from the housing 10, an opening 80 is disposed in a side surface of the housing 10 as shown in this figure. Incidentally, the developing rollers 20 need not be automatically driven as above. For example, a manual drive type of rollers in which an end portion of the photosensitive recording mediuim 78 is manually drawn in the direction of the arrow 48 may be adopted.

The liquid crystal panel 18 is supported on the housing 10 by use of the panel support mechanism 28 so as to be movable in the upper and lower directions in FIG. 1. The support mechanism 28 is controlled by the controller 50 such that in an operating state, the support mechanism 28 moves down the liquid crystal panel 18 so as to tightly fix a photosensitive recording surface of the upper-most one of the photosensitive sheets 78 loaded in the film pack 38 onto the principal surface 42 of the bottom side of the panel 18. The photosensitive sheets 78 are continuously pushed upward by means of a push spring, not shown, disposed in the pack 38. In this configuration, when removing the upper-most sheet 78 from the film pack 38, the support mechanism 28 moves under control of the controller 50 the panel 18 upward by a short distance. The apparatus may also be constituted such that the liquid crystal panel 18 is always brought into contact with the surface of the photosensitive sheet 78.

The liquid crystal panel 18 is, as described above, tightly brought into contact with the image recording medium of the upper-most recording medium at least in the operating state. The light created from the light source 12 is formed throught the optical system including the mirrors 14 and 16 into a collimated light substantially, which is then irradiated onto the principal surface 40 of the panel 18. This guarantees a clear image to be recorded on the recording medium 78.

In this connection, the light source 12, producing a white light or a visible light 34 similar thereto is advantageously utilized. A single light source or a plurality of light sources may be disposed to generate a white light or a light similar thereto. For example, a light-emitting diode strobe (xenon lamp), a wolfram lamp, a fluorescent lamp, an electroluminescence element, a plasm discharge tube, or the like may be used. The light source 12 is driven by a light source driver circuit 66 under control of the control circuit 50.

In a light path 34 immediately following the light source 12, a color filter 54 is arranged as shown in the figure. The filer 54 includes three filters or filter elements respectively passing therethrough, three principle colrs red. R; green, G; and blue, B. For simplicity of the figure, only one filter element or sheet is shown; however, the filter 54 is supported by a filter drive mechanism 56 such that either one of the three filters is selectively installed in the light path 34 associated with the light source 12 under control of the control circuit 50. In consequence, the white light 34 emitted from the light source 12 is passed through either one of the three filters so that one of three color components of the light 34 reaches the liquid crystal panel 18.

The light source need not be limited to the single light source above. Three light sources associated with three principle colors R, G, and B may be disposed. For example, the three light sources may be arranged in a triangular shape so as to dispose the red, green, and blue filter elements for the light sources, respectively. Alternatively, for example, a light-emitting diode or an electroluminescence element may be arranged to produce three principle colors from the light source 12 itself. In this case, neither the filter such as the filer 54 nor the filter drive mechanism 56 need be disposed and the light source driver circuit has a function to selectively cause the light sources to emit light. Furthermore, a color addition method above need not be necessarily employed, that is, a color subtraction method is also applicable.

Referring now to FIG. 3, a video signal input terminal 46 is connected to a video signal circuit 58. The input terminal 46 receives an input signal as an input thereto, which may be in the form of a television signal or a signal of an electronic still camera. The video signal circuit 58 is a signal processor circuit for converting the video signal of this signal type into digital data including three principle color components of R, G, and B signals. This circuit 58 supplies an output 60 to a dta input of a frame memory 62. The video signal received by the input terminal 46 may be in the form of three principle color components or of digital data of similar composition. In the case of digital data, the video signal circuit 58 can be dispensed with.

The frame memory 62 is an acccumulator circuit for storing therein a frame of data including the R, G, and B components. The frame memory 62 conducts read and write operations under control of the control circuit 50. The memory 62 has a read data output 64, which is linked with the liquid crystal panel driver circuit 44. The driver circuit 44 carries out a raster drive operation on the respective pixel cells of the liquid crystal panel 18 in a plane-sequential manner according to the three principle component data read out from the frame memory 62.

The control circuit 50 functions to supervise and to control the overall operations of the apparatus. This circuit 50 is connected to an operation display section 68. Owing to this provision, the operator can manually supply instructions to the system and the system can display system states to the operator. This configuration includes a power source 76, which is direct-current source such as a dry battery or a secondary battery for applying a direct current to such electric circuit elements of this system as the liquid crystal panel 18 and the light source 12.

In operation, when the film pack 38 is installed in the housing 10, the liquid crystal panel 18 is moved downward up to a position shown in FIG. 1 by means of the panel support mechanism 28 under control of the controller 50. As a result, the recording surface of the upper-most one of the photosensitive sheets 78 loaded in the film pack 38 is tightly fixed onto the principal surface 42 of the bottom side of the panel 18. The covers 22 and 24 are operened so as to be kept retained at the respective predetermined postions as shown in FIG. 1. This state is sensed by the control ciruit 50 through an operation of the switch 70.

The video signal input terminal 46 is connected to an output from a video signal source such as an electronic still camera playback apparatus. When a read operation of a video signal is instructed through the operation panel 68, the controller 50 controls the video signal circuit 585 and the frame memory 62 via the control lines 71 and 72, respectively, thereby obtaining a video signal supplied to the input terminal 46. The video signal circuit 58 then transforms the video signal into digital data of a predetermined format, for example, a signal configuration including R, G, and B component signals. The resulsant color component signals are stored in the frame memory 62.

When the operator's panel 68 is operated to enter an image recording instructions, the controller 50 first controls the filter drive mechanism 56 in response thereto so as to select from the filer 54 a filer element of a particular color component such as a red component, thereby inserting the selected filter sheet in the light path 34 associated with the light source 12. Furthermore, an instruction to output data of the red component signal is supplied to the frame memory 62. From the frame memory 62, consequently, the red component data is sequentially delivered in a raster scan order. The data is amplified by the driver circuit 44 so as to be supplied as a drive signal from the output 36 to the liquid crystal panel 18. As a result, the panel 18 is driven by the red component signal to produce a visualized monochrome image associated with the signal.

At a timing synchronized with the drive of the liquid crystal panel 18, the control circuit 50 controls the light source driver circuit 66 to cause the light source 12 to emit light for a predetermined period of time. For example, in a case where a sheet of recording paper for an instant photograph of a positive type is used as the photosensitive material 78 of the film pack 38, a small-sized volfram lamp is employed as the light source 12, and the light source 12 is driven with a power having a voltage from 1.5 to 2.5 volt and a current 0.5 to 1.0 ampere, an exposure time in which the light source 12 emits lights for an exposure of the photosensitive sheet 78 is favorably set to from several milliseconds to several tens of milliseconds. Moreover, in a case where a light-emitting diode is adopted as the light source 12 and the light source is driven by a power having a voltage of several volts, five volts, for example, and a current in a range from several tens of milliampere to several hundreds of milliampere, the exposure time is favorably set to from several tens of milliseconds to several hundreds of milliseconds. Through the operation above, an image of the red component is recorded as a latent image on the photosensitive sheet 78.

Similarly, for the images related to the remaining green and blue component signals, the control circuit 50 sequentially selects the associated filter elements so as to read the corresponding color component data from the frame memory 62 and then to drive the liquid crystal panel 18 and the light source 12 at the same time, thereby superimposing the resultant image onto the photosensitive sheet 78. The controller 50 adjusts, for the respective color component images, the exposure periods of time of the light source 12 for the photosensitive sheet 78 so as to carry out a color correction of the original image. Namely, the color correction has been achieved on the color image thus completely produced on the photosensitive sheet 78 through the superimposing operation and the exposure.

When the latent images of the three principle colors are recorded, the contoller 50 controls the panel support mechanism 28 to move the liquid crystal panel 18 slightly upward and then orders the developing roller driver circuit 52 to drive the developing rollers 20. As a result, the recorded photosensitive sheet 78 is smoothly fed from the film pack 38 to the conveying path such that the film sheet 78 is developed by the developing rollers 20 located at an intermediate position in the conveying path. If the photosensitive sheet 78 of an instant photograph is employed, the developer agent is spread on the sheet 78 so that the latent image is thereby developed and is then fixed. In this fashion, a color image represented by the video signal supplied via the input terminal 46 is obtained as a visible image on the recording medium 78, which is then ejected through an opening 80.

When the apparatus is not in use, as shown in FIG. 2, the covers 22 and 24 are foled down. The control circuit 50 senses the folded state by use of the switch 70 so as to then stop the functions of the entire apparatus.

In the embodiment above, a photosensitive sheet 78 formed with a photosensitive material of a negative-positive type (to be referred to as a negative type herebelow) may be tightly fixed onto the liquid crystal panel 18 such that after a visible image representing a negative image of the video signal is produced, the image may be developed on the sheet 78. Alternatively, a photosensitive sheet 78 of a positive-positive type (to be referred to as a positve type herebelow) may be tightyly fixed onto the liquid cyrstal panel 18 such that after a visible image representing a positive image of the video signal is created, an exposure is conducted on the sheet 78 so as to thereafter develop the image . However, image characteristics vary between the cases utilizing the positive-type sheet 78 and the negative-type sheet 78.

Figure 4:
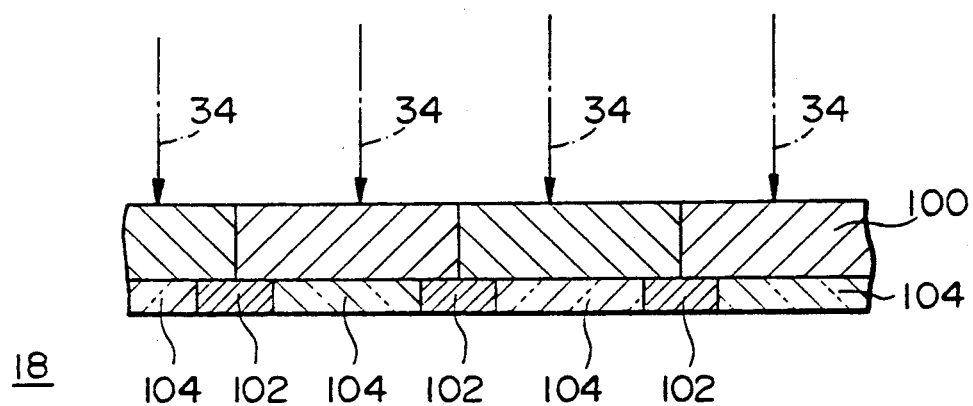
FIG. 4 is a schematic diagram showing a liquid crystal panel in a blocked state.
Figure 5:
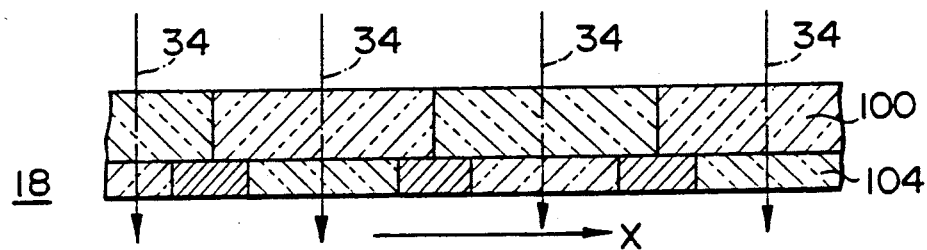
FIGS. 5 and 6A to 6C are respectively a diagram and graphs showing relationships between the liquid crystal panel in a transmissive state and amounts of light.

Referring next to FIGS. 4 to 7, the image characteristics will be described in association with the cases of the negative-type sheet 78 and the positive-type sheet 78. FIGS. 4 and 5 illustratively show cross-sectional veiws of the liquid crystal panel 18. The panel 18 includes a liquid crystal shutter 100, which is in a blocked state or in a tansmissively state in FIG. 4 or 5, respectively. In order to drive the shutter 100, the liquid crystal panel 18 includes a drive element and electrode wirings disposed on a glass support substrate, not shown, on the principal surface of the panel 18. A driver element ara 102, in which the driver element and wirings are disposed blocks light irradiated from the light source 12. Consequently, only a region 104 other than the driver element are 102 allows the light to pass therethrough. In an situation where the liquid cyrstal shutter 100 is set to the blocked state by the drive element, the light 34 is not transmitted through the shutter (FIG. 4). When the shutter 100 is in the transmissive state, the light 34 passes through the shutter 100 and the area 104 other than the driver element are 102 (FIG. 5). Under this condition, if the driver element region 102 were not disposed, the light would directly pass through the entire surface of the liquid crystal panel 18. Namely, the amount of light received on the photosensitive sheet 78 is fixed in any locations on the surface thereof (FIG. 6A).

Figure 6A:
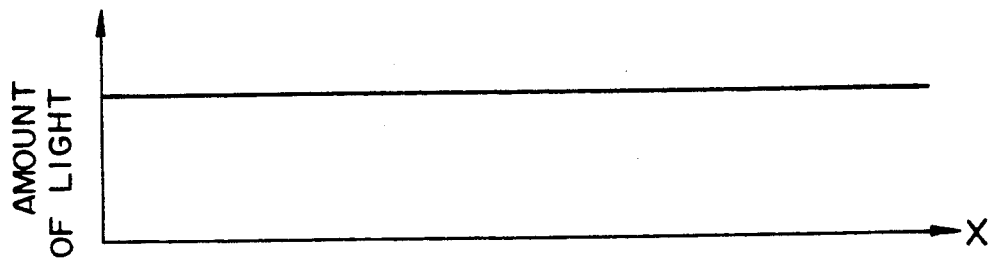
Figure 6B:
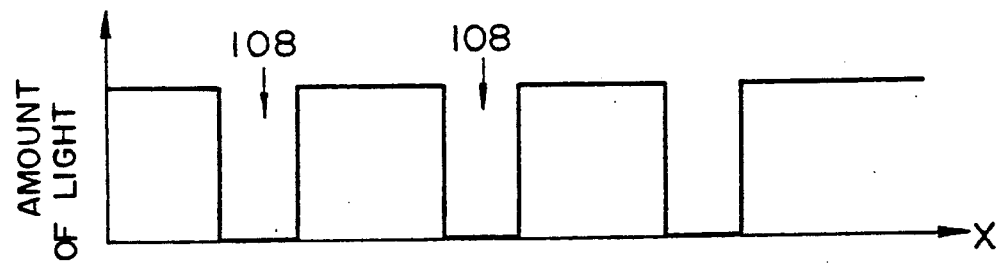
Figure 6C:
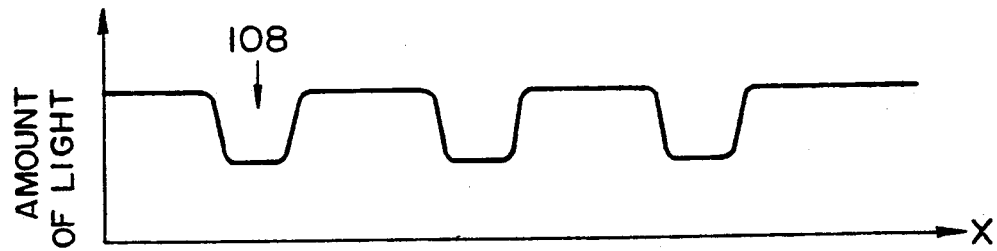
Figure 7:
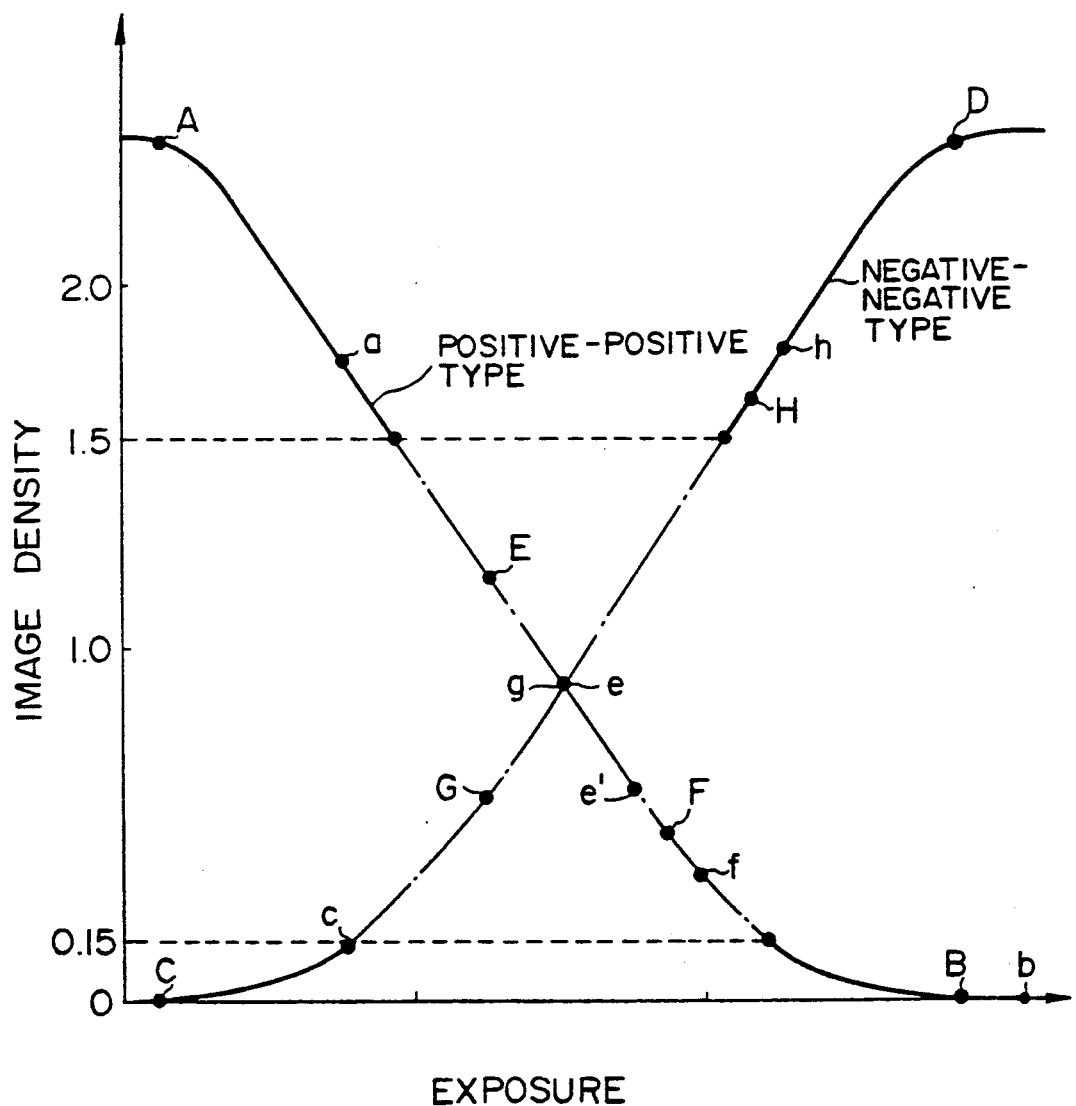
FIG. 7 is a graph showing relationships between image densities and exposure amounts associated with printing paper of positive-positive and negative-positive types.

However, since the driver element region 102 blocks the light 34, the X-axis coordinates and the amount of light received on a principal surface of the panel 18 have relationships as shown in FIG. 6B. Moreover, due to the diffraction, scattering and reflection of the light 34, since a shadow portion 108 of the region 104 other than the driver element area 102 also undergoes an exposure to some extent, the amount of light is actually received as shown in FIG. 6C. In conssequence, for example, when using a photosensitive sheet of a negative-positive type 78, for a white portion of a negative image displayed on the liquid crystal panel 18, namely a portion where the amount of transmitting light develops a maximum value, the image density after the development of the photosensitive sheet 78 is lowered in a portion associated with the driver element region 102. The value Dmax is hence generally reduced. Consequently, the pertineent image density is lower than the maximum density representing black. Similarly, when employing a photosensitive sheet of a positive-positive type 78, for a white portion of a positive image presented on the liquid crystal panel 18, namely, a portion where the amount of transmitting light takes a maximum value, the image density associated with the driver element region 102 of the recording medium develops a high value. In consequence, the pertinene image density is higher than the minimum density representing white and hence the image is generally displayed in gray. In order to avoid this disadvantageous phenomenon, the amount of exposure may possibly be increased.

in this connection, a description will be given of relationships between the exposure amount and the image density with reference to the graph of FIG. 7.

As can be seen from a characteristic curve drawn for the sheet of a positive-positive type 78, when the liquid crystal shutter 100 is in the blocked state, the exposure amount takes a minimum value and hence the image density develops a maximum value. Let us assume here the maximum value is obtained at a point A in the curve. In contrast thereto, when the sheet 78 is completely exposed to the light, the image density takes a minimum value. This value is assumed to be developed at a point B. When the shutter 100 is in the transmissive state, in a shade portion of the driver element region 102, owing to the diffractions, scattering, and reflection of the light 34, the exposure amount does not take the minimum value. In this case, a density indicated at a point E is obtained. Consequently, when an image including a shite portion on the photosensitive sheet 78 is pexposed to the light and is then developed, the image density in the white portion perceived with the naked eyes is substantially equal to an average density obtained in consideration of the shade and transmissive areas of the frame. Namely, the densithy is developed at a point F which is a point associated with a weighted mean of points E and B.

On the other hand, in a characteristic curve of the sheet of the negative-positive type 78. when the liquid crystal shutter 100 is in the blocked state, the image density takes a minimum value at a point C in the graph. When an image on the sheet 78 is completely exposed, the image density becomes to be a maximum at a point D. Like in the case above, a shadow portion of the driver element area 102 of the panel 108 does not develop the minimum image density. The density in this case is obtained at a point G. Consequently, when an image including a white portion on the photosensitive sheet 78 is exposed to the light and is then developed, the mean value of the image density of the white portion is developed at a point H. As above, since the sheets of both of the positive-positive and negative-positive types are influenced from the driver element region 102 for example, in the case of the sheet of the positive-positive type 78, the white portion becomes to be gray, namely, a foggy picture is attained. In the case of the sheet of negative-positive type 78, the density of black (Dmax) is slightly reduced. Conparing these pictures with each othere, visually, although the Dmax value is slightly decreased as compared with the foggy image associated with the positive-positive type, the picture on the sheet of the negative-positive type free from the fog is considerably more beautiful or acceptable. Namely, the photosensitive material 78 of the negative-positive type is more favorable.

In a case where the sheet of the positive-positive type 78 is used, in order to represent an inherently white image in a color similar to white. the exposure amount need only be increased. In this situation, since the points A, E, and F on the curve associated with the sheet of positive-positive type 78 are respectively shifted to points a. e, and f, the color of the gray portion F is slightly changed to be more similar to a white portion B. When the exposure amount is further increased to reduce the fog in the picture, the Dmax and the resolution are lowered.

On the other hand, the photosensitive sheet of negative-positive type 78 has a range in which the Dmax value can be sufficiently increased without excessively increasing the fog and without lowering the resolution. In practical cases, the Dmax value and the Dfog (fog density) value are favorably set to at least 1.5 and at most 0.15, respectively. In the graph of FIG. 7, the favorable ranges are represented with four solid lines respectively including the intersections between the curves and broken lines.

In consequence, it is favorable to use the photosensitive material of negative-positive type. Furthermore, a so-called silver halide photosensitive material for a thermal development is desirably employed.

Since, the viddo printer in accordance with the present invention is structured, as described above, such that a recording medium is tightly fixed onto a liquid crystal panel so as to record an image on the recording medium, the print time is minimized and the size thereof is reduced, for example, so as to be utilized as a portable equipment. In addition, since a liquid crystal panel manufactured in mass production can be used, the cost of the video printer is lowered. In addition, when a photosensitive material of negative-positive type is to be exposed to the light, a picture is attained with a sufficiently large Dmax value and without the fog.

While the present invention has been described with reference to the particular illustrative embodiment, it is not to be restricted by the embodiment but only by the appended claims. It is to be appreciated that those skilled in the art can change or modify the embodiments without departing from the scope and spirit of the present invention.

What is claimed is:

1. A video printer in which a video signal representing an image is received so as to record a visible image from the video signal on a photosensitive recording medium comprising:

an input terminal means for receiving the video signals as an input thereto;

a recording medium accommodating means for accommodating the photosensitive recording medium;

a liquid crystal panel means fixed to a photosensitive surface of the photosensitive recording medium and responsive to the video signal to display the image as a monochrome image;

a light source for producing a visible light;

an optical system for directing the visible light from said light source substantially in the form of a collimated beam to said liquid crystal panel;

a housing having mounted therein said input terminal means, said recording medium accommodating means, said liquid crystal panel means, said light source, and said optical system;

developing means arranged in said housing for developing the photosensitive recording medium from said recording medium accommodating means , and for ejecting the medium from said housing; and an electronic circuit mounted in said housing for receiving the video signal from said input terminal means and for driving said liquid crystal panel means in response to the video signal so as to control said liquid crystal panel means and said light source;

wherein said electronic circuit drives said liquid crystal panel means in response to the video signal such that said light source emits light and exposes the photosensitive surface of the photosensitive recording medium via said optical system and said liquid, crystal panel means, and causes said developing means to devolop the photosensitive recording medium, and to eject the medium.

2. A video printer in accordance with claim 1, wherein:

said liquid crystal panel means includes a light blocking region in which a visible light produced from said light source is blocked: and said photosensitive recording medium is a photosensitive material of a negative-positive type.

3. A video printer in accordance with claim 1, wherein said photosensitive recording medium is a silver halide photosensitive material for a thermal development.

4. A video printer in accordance with claim 1, wherein said photosensitive recording medium is a silver halide photosensitive material for a thermal development.

5. A video printer in accordance with claim 1, wherein:

the input video signal is a video signal of a color image; and said optical system includes three color filter elements such that either one of said three color filter elements is selectively inserted into a light path associated with said light source.

6. A video printer in accordance with claim 1, wherein said housing includes two covers and bellows linking said two covers.

7. A video printer in accordance with claim 6, wherein said covers are provided with mirrors, said mirrors conducting the light from said light source to said liquid crystal panel.

8. A video printer in accordance with claim 1, wherein
said photosensitive recording medium is a photosensitive material for instant photograph; and
said recording medium accommodating means comprises a film pack including photosensitive recording sheets and a bag containing a developing agent disposed on end edges of said recording sheets.

* * * * *